United States Patent [19]

McClintock et al.

[11] Patent Number: 5,069,969
[45] Date of Patent: Dec. 3, 1991

[54] PRESSURE SENSITIVE ADHESIVE TAPE WITH CENTRAL RELEASE LINER

[75] Inventors: Jack M. McClintock, Pittsburgh, Pa.; Gerald H. Knittel, Brecksville, Ohio

[73] Assignee: Morgan Adhesives Co., Stow, Ohio

[21] Appl. No.: 487,396

[22] Filed: Feb. 28, 1990

[51] Int. Cl.$^5$ ............................ B32B 7/12; F16L 9/00
[52] U.S. Cl. ...................... 428/36.5; 428/40; 428/42; 428/352; 428/906; 138/157
[58] Field of Search ................... 428/40, 42, 202, 352, 428/36.5, 906; 138/157, DIG. 1

[56] References Cited

U.S. PATENT DOCUMENTS

| 4,157,410 | 6/1979 | McClintock | 428/40 |
| 4,389,270 | 6/1983 | McClintock | 428/40 X |
| 4,584,217 | 4/1986 | McClintock | 428/40 |
| 4,595,615 | 6/1986 | Cohen | 428/40 X |
| 4,778,700 | 10/1988 | Pereira | 428/40 |
| 4,778m703 | 10/1988 | Fontanilla | 428/40 |
| 4,780,347 | 10/1988 | Cohen | 428/40 X |
| 4,857,371 | 8/1989 | McClintock | 428/40 X |

Primary Examiner—George F. Lesmes
Assistant Examiner—D. R. Zirker
Attorney, Agent, or Firm—Oldham & Oldham Co.

[57] ABSTRACT

A sandwich type composite adhesive construction in a simpler form, composed of a central release liner having a permanent adhesive layer on one side thereof and a pressure sensitive adhesive layer on the other side preferably separated therefrom by a release coat or member, and at least one release member on said adhesive layers but in a more complex form containing additional carrier layers or strengthening members including at least one or more support layers between two layers of permanent pressure sensitive adhesive. This adhesive construction provides a product, such as a pipe insulation that has unique properties and is cost effective.

12 Claims, 5 Drawing Sheets

PRESSURE SENSITIVE ADHESIVE TAPE WITH CENTRAL RELEASE LINER

TECHNICAL FIELD

This invention relates to sandwich type adhesive constructions and particularly to adhesive tapes and their uses. More particularly, this invention relates to adhesive constructions having a sandwich construction as follows: a center release liner having a pressure sensitive adhesive layer on both sides, one of the adhesives being a permanent pressure sensitive adhesive layer and the other a removable pressure sensitive adhesive layer, and at least one exterior release liner covering the outside surface of at least one of said adhesive layers.

Specifically, the adhesive construction in a simpler embodiment includes a center release liner having a release coat on one side of said center liner with a pressure sensitive permanent adhesive layer covering said release coat, a removable pressure sensitive adhesive layer adhered to the other side of said center liner, and an external release layer positioned on the outside of at least one of said adhesive layers with the external release layer adjacent the pressure sensitive permanent adhesive layer being separated from said external release layer by a release coat. In another embodiment the adhesive construction comprises a center release liner having a release coat on one side covered by a pressure sensitive permanent adhesive layer having a carrier material therein or at least one strengthening member adhered thereto by at least one more layers of pressure sensitive permanent adhesive, a removable pressure sensitive adhesive layer adhered to the other side of said center release liner and an external release liner adhered to the outside surface of at least one of the adhesive layers with said external release liner having a release coat adjacent to the pressure sensitive permanent adhesive.

BACKGROUND OF THE INVENTION

Pressure sensitive adhesive constructions which include a center release liner with pressure sensitive adhesive layers on both sides thereof are known in fiberglass insulation industry and used commercially. Such constructions described in U.S. Pat. Nos. 4,157,410; 4,389,270; and 4,584,217 to McClintock (one of the inventors herein), for example. These patents teach that both pressure sensitive layers are generally the same material, although they may be different, but to the best of our knowledge, have been permanent pressure sensitive adhesives. These patents teach that conventional pressure sensitive type adhesives, viz. the permanent type, may be used, specifically mentioning an adhesive containing an acrylic based or a rubber-based adhesive as well as emulsion adhesive. Also hot melt adhesives may be used. Adhesive constructions manufactured commercially for years under these patents have had permanent pressure sensitive adhesive layers, preferably acrylate, on both sides of the central release liner, and have included exterior release liners typically on both of the pressure sensitive adhesive layers.

These commercial adhesives are of relatively complex construction. Consequently, the industry has attempted for years to go to a simpler construction, viz. less layers or coatings in the sandwich. They have been unable to provide a simpler adhesive construction for insulation of pipe that allowed the insulation to be readily packaged and handled without the adherent surface being protected from being soiled, bent or wrinkled during packaging and handling, which creates installation difficulties and increases the cost and labor.

DISCLOSURE OF THE INVENTION

This invention according to one aspect provides a simpler adhesive construction resistant to soiling, bending and wrinkling, comprising a center release liner having adhesive layers on both sides of said center liner, at least one of said adhesive layers being a layer of a pressure sensitive permanent adhesive, and the other being a pressure sensitive removable adhesive with a release coat only on the side of the center release liner adjacent the permanent adhesive side, and an exterior release liner covering at least one of said pressure sensitive adhesive layers.

One of the pressure sensitive adhesive layers is always a layer of a permanent adhesive, while the other adhesive layer is a removable pressure sensitive adhesive.

One or both of the adhesive layers may be covered with an exterior release liner.

This invention according to another aspect is a self-wound adhesive tape roll that may be unwound. This roll comprises a simpler adhesive construction comprising a center release liner sandwiched between pressure sensitive adhesive layers on both sides of the center release liner, at least one of the adhesive layers being a layer of a permanent adhesive, the other layer being a removable pressure sensitive adhesive, and an exterior release liner covering the outermost surface of at least one of the adhesive layers, with a release coat positioned on the permanent adhesive layer between the center liner.

This invention, according to a further aspect, affords a simpler adhesive construction for adhering two surfaces together and is cost effective. This method of adhering the two surfaces together in one embodiment comprises removing the outer release liner from the pressure sensitive permanent adhesive, and pressing or contacting the exposed permanent adhesive to the surface to be adhered. To keep the adhesive construction from bending or wrinkling, the removable pressure sensitive adhesive may be adhered to the other surface while the adhesive construction is in the storage mode. For instance, where the surfaces to be adhered are the surfaces of a jacket of an insulation for pipes, the pressure sensitive permanent adhesive can be adhered on a surface of the jacket (viz. the Kraft side of an ASJ jacket) that laps over to seal the slit in the insulation and the removable pressure sensitive adhesive layer is adhered to the exposed surface of the jacket on the other side of the slit to close the insulation in the storage or closed mode. Thus, the pipe jacket product can be easily handled while it is placed in a packing case, shipped to the point of installation, removed from the packing case in a closed mode, free of contamination, and can be easily handed or tossed to a person on scaffolding during the installation phase.

One of the novelties of this construction is that it allows easy fabrication, i.e. cutting and fitting of the insulation construction in the closed mode. Thus, the insulation construction allows the insulation to be fabricated, where needed, and to be placed on the pipe by removing the center release liner from the pressure sensitive permanent adhesive and thereby at the same time remove the layer of removable pressure sensitive adhesive to allow the insulation to be placed on the pipe. With the insulation placed around the pipe, the adhesive construction thereon can be pressed down on the area designated 80 in FIG. 8 to adhere the pressure sensitive permanent adhesive thereto to retain the insulation on the pipe.

BEST MODE FOR CARRYING OUT THE INVENTION

This invention will be described with particular reference to the preferred embodiments and best modes thereof.

Figure 1:
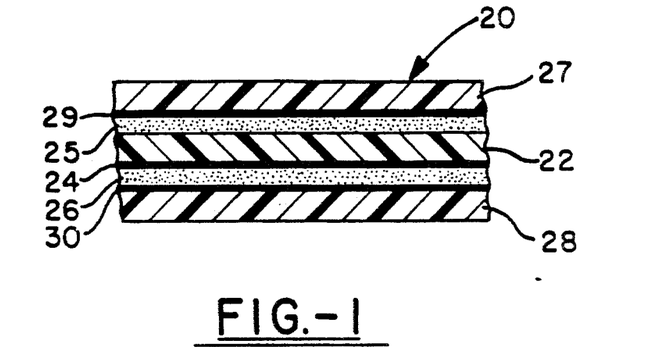
FIG. 1 is an enlarged cross-sectional view of one embodiment of a composite adhesive laminate construction according to this invention.

Referring to FIG. 1, an adhesive sandwich like construction 20 according to this invention comprises a center release liner 22, a silicone release coating 24 on only one side of said center release liner, a permanent adhesive layer 26 contacting the silicone release coating 24. On the other side of said center release liner 22, a removable pressure sensitive adhesive layer 25 is applied directly to the center release liner 22, and a first and a second exterior release liners 27 and 28 respectively, coated on their respective inner surfaces with silicone release coatings 29 and 30 respectively, covering the permanent and removable pressure sensitive adhesive layers 26 and 25, respectively.

Center release liner 22 may vary in thickness from about 0.5 mil to about 5 or 6 mils (1 mil=0.001 inch). Greater thicknesses are generally impractical because of high cost and lack of flexibility. A desirable thickness in most instances is from about 1 to 4 mils and preferably 3 to 4 mils when utilized in connection with a pipe jacket. Various common materials and/or films well known in the adhesive tape industry may be used for central release liner 22. These include Super Calender Kraft paper, polyethylene-coated paper, polyethylene film, polyester film, polyvinyl film, polypropylene film, and the like.

A release coating 24 is applied to one side only of the center release liner 22. These release coatings are generally applied in the well known manner, such as a mayor rod coating or the like and generally are of the customary thicknesses used in the adhesive industry and usually less than 0.1 mil or more in thickness. The release coating is preferably a conventional release material such as the well known commercial silicones recommended for release coats. It is often desirable to dry the release coat at elevated temperatures, say 90°–100° C.

The permanent pressure sensitive adhesive layer 26 is applied to or coated on the silicone-coated side 24 of the center release liner 22. The permanent adhesive layer 26 generally varies in thickness from about 0.5 mil to about 4 mils, with a desirable thickness from about 1 mil to about 2 mils. A preferred thickness is about 1.5 mils. Larger thicknesses can be used but tend to be uneconomical. Common or conventional pressure sensitive type adhesives of the permanent type well known in the art and available commercially from the adhesive manufacturers may be used. These include, for example, acrylic base adhesives, of the pressure sensitive permanent type such as currently used for pipe insulation, rubber based adhesives such as a blend of styrene-butadiene rubber (SBR) and polyisoprene, and at least a suitable conventional tackifier such as hydrogenated rosin ester, polyterpenes, polymerized alkyl styrenes and polymerized petroleum derived monomer resin such as polybutene resin and related resins. Both acrylic based and rubber based adhesives may be formulated to a specific substrate as is well known to the adhesive chemist, containing for example, flame retardant additives, dyes, antioxidants, and other desired additives. The permanent adhesive coating weight for the adhesive layer 26 is that of adhesives normally used in adhesive construction for pipe insulation. Adhesive layers may be applied to central release liner 22 or the release layer or coat 24, by any common or conventional and well known techniques such as calendaring, coating, spraying or the like. Either a water based (i.e. emulsion) or latex adhesive or a solvent based adhesive may be used as well as hot melt.

The permanent adhesive layer 26 is a layer of any permanent type adhesive known in the art, and includes, for example, the well known commercially available acrylics used in the insulation pipe industry, or hot melts.

The term, "permanent adhesive" and "removable pressure sensitive adhesive" are used in their well known, art-recognized meanings. A permanent adhesive is one which forms a strong bond with a substrate to which it is applied, so that neither the adhesive nor any backing (other than a release coated backing such as liner 22 herein coated with release coat 24) to which the adhesive is applied can be removed without damage. A removable pressure sensitive adhesive, on the other hand, is one which can be peeled off, together with the backing to which it is applied, from a substrate surface without damage to either the adhesive or the backing.

Generally, the removable pressure sensitive adhesives are tested for removability on the surface to which they are to be removably adhered. For example, where the adhesive construction is to be used on the pipe insulation having an ASJ jacket, then the removable pressure sensitive adhesive is spread or coated on a portion of the ASJ jacket and then the uncoated portion is bent back at an angle of 180° and pressed down onto the adhesive portion. Then the two portions of ASJ jacket are pulled apart. If the adhesive can be peeled off without damage or residues of the adhesive being left on the uncoated ASJ jacket, the adhesive is classed as a removable pressure sensitive adhesive.

Removable pressure sensitive adhesive such as those latex ones available from Union Carbide or other commercial producers are the type useful herein but they will be tested on the specific substrate being used to decide the one to use.

Representative removable pressure sensitive adhesives are those well known acrylic emulsions described in the following U.S. Pat. Nos.: 3,922,464 of Spenser Silver et al., 4,645,711 of Richard E. Bennet et al., 4,629,663 of Francis W. Brown et al. and 4,599,265 of Donald L. Esmay. These patents are incorporated herein by reference. The earliest of these removable pressure sensitive acrylic emulsion adhesive patents (Silver et al.) comprises: (a) a copolymer of from 88 to 99 parts by weight of at least one terminally unsaturated vinyl monomer, with 70-100% by weight of said vinyl monomer being a non-tertiary alkyl acrylate, each alkyl group having at least half its carbon atoms in a straight chain and having usually 4 to 12 carbon atoms; (b) from 0.2 to 5 parts by weight of at least one vinyl unsaturated, homopolymerizable emulsifier monomer which is a surfactant having both hydrophobic and hydrophilic moieties and optionally may contain from 0 to 10 parts by weight of at least one Zwitterion monomer.

The Bennett et al. patent is an improvement on the Silver et al. patent and uses tackifier resin in amounts of 5-50% by weight, such as hydrogenated resin ester, polyterpene, polymerized alkyl styrene and polymerized petroleum-derived monomer resins to give the removable pressure sensitive adhesive better resistance to lifting forces at elevated temperatures while also being cleanly removable.

The Brown et al. patent teaches how to make removable pressure sensitive adhesives of the type used as automotive masking tape. The Esmay patent produces removable pressure sensitive adhesive from an alkyl acrylate polymer of low tack but sufficiently tacky to adhere to ordinary substrates by being cross-linked and nearly free of polar substituents. Thus, by adjusting the degree of cross-linking, the pullback or tack value of the adhesive can be made for use desired for the substrate. The usual automobile masking tapes are useful in this invention, particularly where the jacket is primed with a primer as described hereinafter.

The thickness, coating weight, and methods of application of the removable pressure sensitive adhesive layer 25 are similar to those of the permanent adhesive layer 26. Thus, adhesive layer 25 is generally from about 0.5 to about 4 mils, desirably from about 1 to about 2 mils, preferably about 1.5 mils thick.

Figure 2:
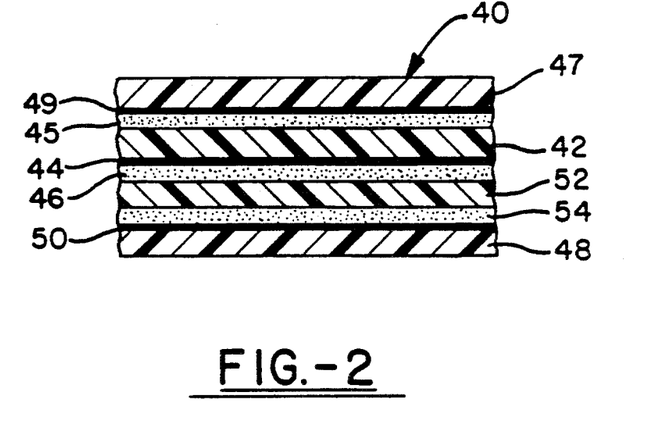
FIG. 2 is an enlarged cross-sectional view of another embodiment of this invention containing multiple support (strengthening) layers (sometimes referred to as a carrier member for the adhesive) for the adhesive and/or release layer or coat to provide a bulking or cushioning effect to the adhesive.

In order to protect the adhesive layers 25 and 26 in the tape construction during storage, transportation and the like, until its application to an item or article, viz. the pipe jacket, two exterior release liners or backing liners are provided. The first exterior release liner 27 or 47 of FIGS. 1 and 2 is applied to the remaining or exposed surface of the removable pressure sensitive adhesive layer 25 or 45, with a second exterior release liner 28 of FIG. 1 or 48 of FIG. 2, being in contact with the other exposed surface of the permanent pressure sensitive adhesive layer 26 of FIG. 1., or the release coat 50 on the permanent pressure sensitive layer 54 of FIG. 2. The exterior release liners 27 or 47 and 28 or 48 thus protect the respective adhesive layers 25 or 45 and 26 or 46. Exterior release liners may be constructed of the same material as the center release liner 22 (i.e., about 0.5 to about 6 mils thick, desirably 1-4 mils, preferably 3-4 mils). One side of each of the exterior liners (i.e., the inner surface, or the surface which is in contact with the adhesive layer) is coated preferably with a release coating such as 29, 30, 49 and 50. Also, release coatings 24 and 44 may be of the same material. The release coating may be any conventional type of release coating, for example, a silicone coating as set forth with respect to silicone coatings 24, 29 and 30, previously described.

Figure 3:
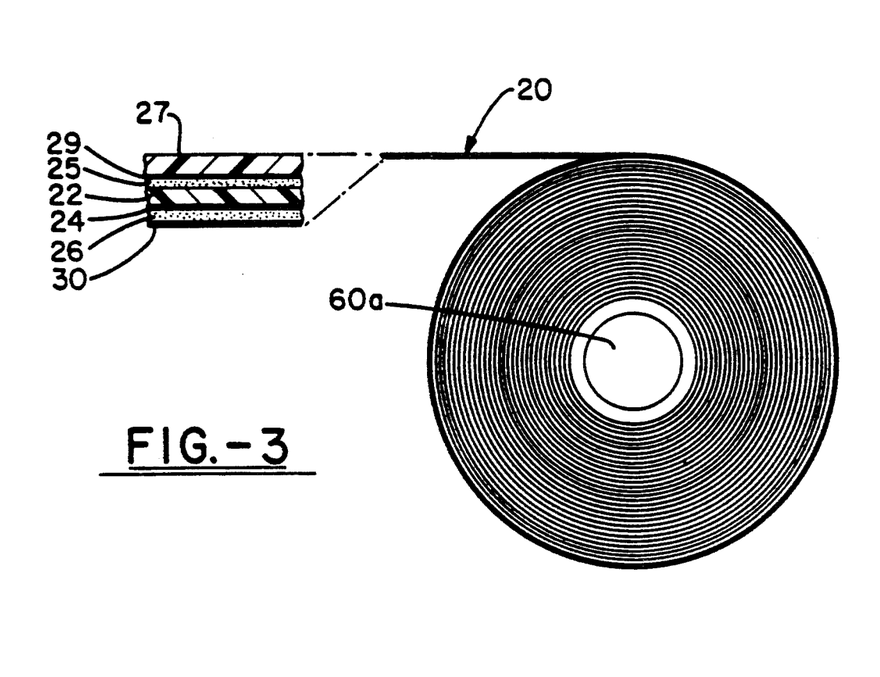
FIG. 3 is a self-wound roll of an adhesive tape according to the embodiments of FIG. 1.
Figures 4, 5:
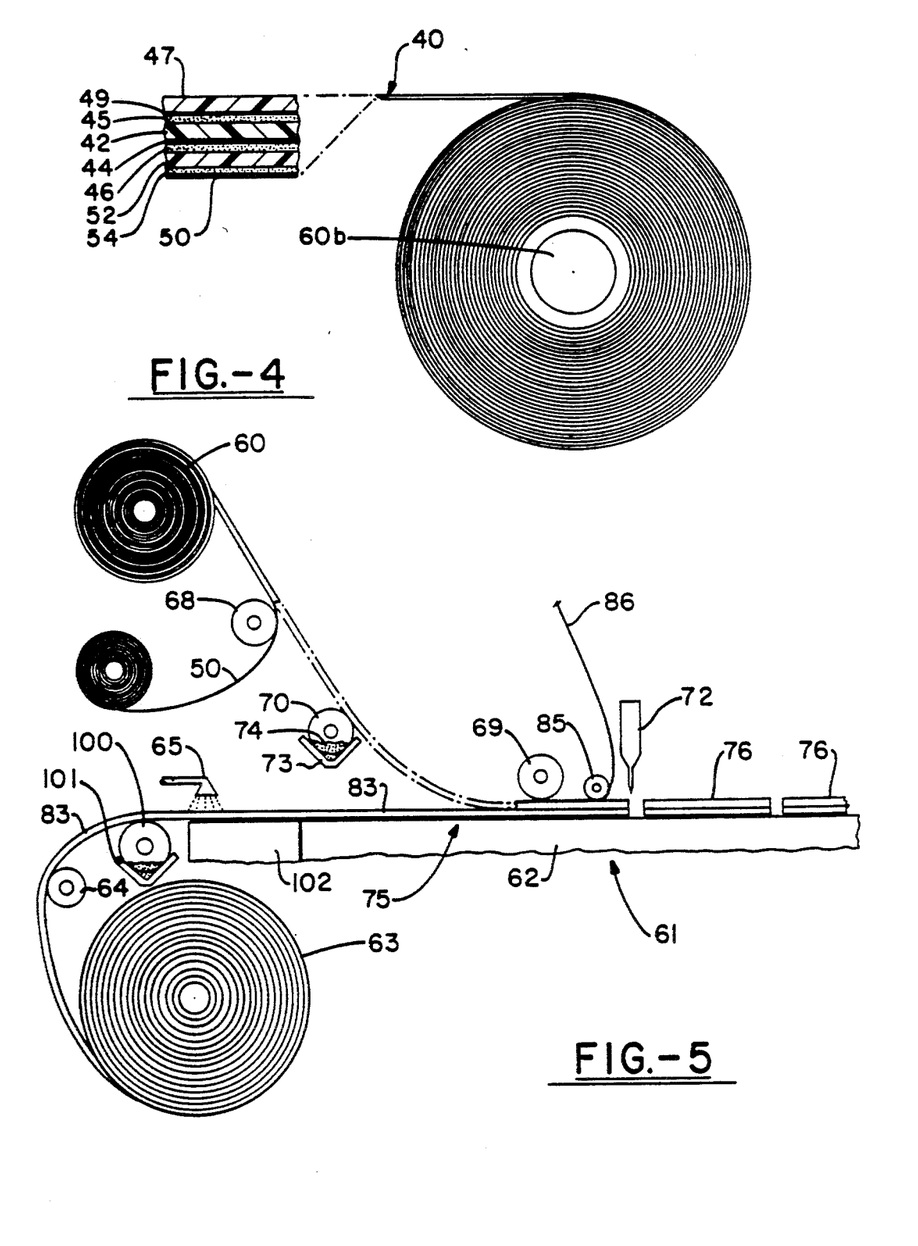
FIG. 4 is a self-wound roll of adhesive tape according to the embodiment of FIG. 2.
FIG. 5 is a schematic view of an apparatus for applying a roll of adhesive tape of this invention to a jacket for a pipe insulation.

In FIGS. 3 and 4 the tapes of FIGS. 1 and 2 respectively, may be wound around a core 60a and 60b. In these embodiments there is no need for the second release liner, i.e. 28 or 48 where the tapes 20 and 40 respectively are wound into a roll.

The adhesive construction of this invention is particularly useful for closing lap seams of the jacket in pipe insulation jackets such as those described in the aforesaid U.S. Pat. No. 4,157,410 or the flexible porous plastic ones. The construction of this invention may be applied in any of the ways described in the aforesaid U.S. Pat. Nos. 4,157,410; 4,389,270; and 4,584,217, all cited supra. These patents are incorporated by reference. In addition, by virtue of the removable pressure sensitive layers 25 or 45, the adhesive constructions 20 and 40 of this invention may be applied in additional ways not previously contemplated as specifically described in regard to FIG. 5 to give novel adhesive construction on the article.

Referring specifically to FIG. 5, the numeral 60 represents a roll of unwindable tape 20 or 40 such as shown by FIGS. 3 and 4, mounted on the tape applying device, indicated generally by numeral 61. The tape applying device 61 comprises an article carrier 62 viz. for a pipe insulator jacket 83 spread flat thereon and means to hold the tape unfolded and flat while it is unwound from roll 63 and advances through the device. The pipe insulator may be made of an integral porous plastic or of molded fiberglass having a jacket 83 such as ASJ thereon (known in the industry as a service jacket). In the embodiment of this figure, the jacket 83 is shown as a roll 63 mounted in the device 61. Also, the conventional fiberglass insulation, viz. pipe insulation may be used. The flexible jacket 83 for the pipe insulator is unrolled from roll 63 to pass over roll 64 along support 62 having a heater section 102 and through the station 75 where the tape 20 or 40 is applied to one side of the jacket 83 by the pressure of roll 69 on the support 62. The adhesive tape on roll 60 is unrolled and the exposed release liner 50 is removed by the action of stripper roll 68 to expose the layer of permanent adhesive. Thus, as the tape advances, the layer of permanent adhesive contacts a side of the jacket which may be wet by a primer, or have a dry primer thereon, to aid in effectively adhering the tape to that side of the wrapped jacket. It should be appreciated that priming is not necessary but gives a better result. The pipe jacket, with the permanent adhesive side of the tape adhered to the jacket, passes release layer peeler 85 to pull off the release layer 86 and then advances to the cutter 72. The cutter 72, which is synchronously hydraulically activated, cuts the jacket with the tape thereon into sections of the desired length, usually 36" long. These sections have the layer of permanent pressure sensitive adhesive, i.e., 25, covered by the release member can have the release member removed to adhere the removable pressure sensitive adhesive layer to the other side of the jacket.

As the composite jacket section 76 moves down the conveyor 62, it is wrapped around a section of pipe insulation (not shown) of fibrous molded siliceous material or a porous plastic material in the normal manner. The normal way is to have the molded or formed insulation section covered with the jacket 83 which usually has at least one and preferably two beads 84 of hot melt adhesive spread longitudinally on either the jacket or the insulation to adhere the jacket to insulation when the jacket is rolled around the fiberglass member to cause one longitudinal edge of the jacket to adhere to the insulation near the slit and to provide a jacket to overlap the slit in the insulation section when one edge of the jacket is near the slit.

Figures 6, 7:
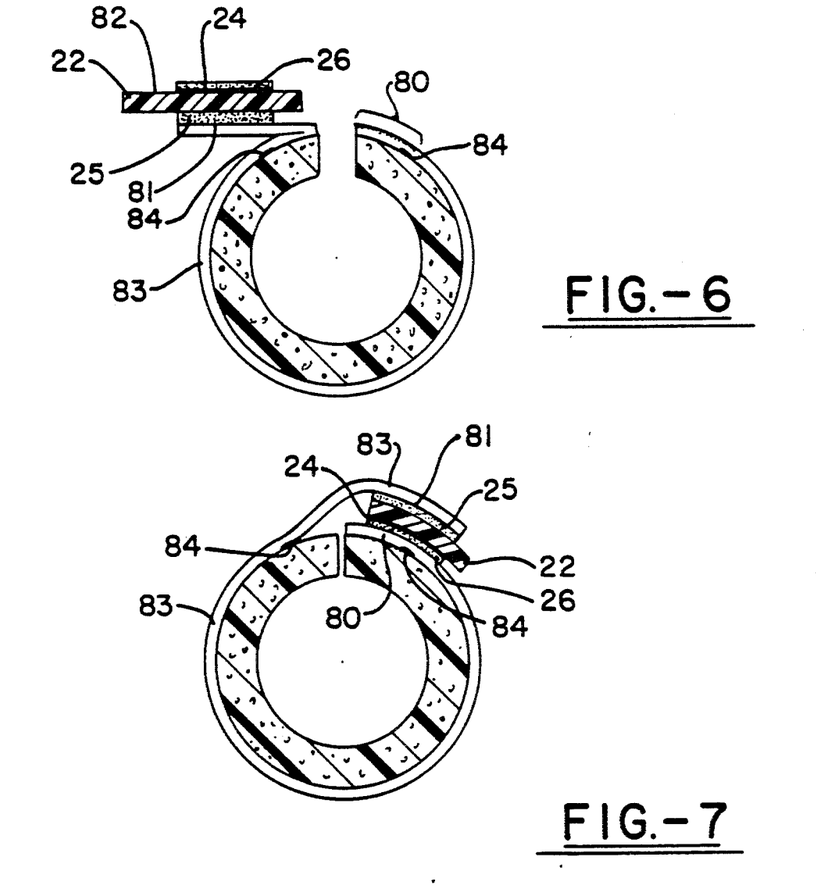
FIG. 6 is an enlarged cross-sectional view of the adhesive construction adhered to the inside surface of the jacket on a section of pipe insulation by the permanent pressure sensitive adhesive layer and folded backward to expose the slit for fitting on a pipe.
FIG. 7 is an enlarged cross-sectional view of the adhesive construction on a section of pipe insulation that is in the storage mode, viz. the removable pressure sensitive layer is adhered removably to the jacket on the seal side of the slit to hold the insulation closed while in the temporary or storage mode until placed on the pipe.

In this invention, the jacket section has the adhesive construction adhered to it in the overlap part 81 that will overlap the slit in the area 80 by the permanent pressure sensitive adhesive. With the adhesive construction on the jacket wrapped around the section of insulation as shown in FIG. 6, the overlapped portion 81 can be adhered to the jacket part 80 by the removal pressure sensitive adhesive layer to seal the slit closed while the jacket insulation is in the storage mode as shown in FIG. 7.

Figure 8:
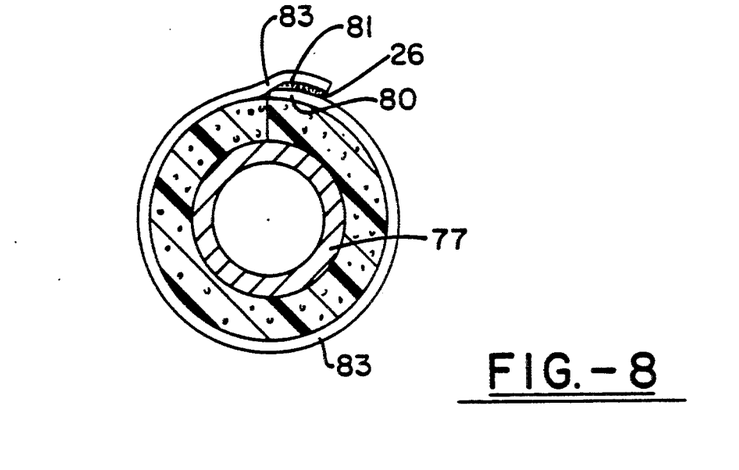
FIG. 8 is a cross-sectional view of the insulation on a pipe with the slit held closed around the pipe by sealing the overlapping jacket with the permanent pressure sensitive adhesive to the jacket on the other side of the slit.

The jacket insulation remains closed during the so-called packing, storage and shipping modes, i.e., until it is desired to place it on a pipe as shown in FIG. 8. When the center release liner is pulled loose and this action normally will remove the removable pressure sensitive layer also and allow the slit to gape open, similar to that shown in FIG. 6. With the slit open, the composite section insulation is placed over and around the pipe 77 as shown in FIG. 8. Then the pressure sensitive permanent adhesive layer is closed as shown in FIG. 8. With the pressure sensitive permanent adhesive layer adhered over area 80.

A primer may be applied to wet the surface of the permanent adhesive layer by the adhesive primer roll 70 mounted rotatively in a box 73 containing primer 74, or other suitable means such as spraying as by spray head 65 may be used to apply the primer. Alternatively, the primer may be coated on the jacket 83 as it passes over roll 100 and dried as it passes heater 102. The primers that may be used are well known in the coating industry.

Although any of the primers may be used, the ones most desired use hydrocarbon or chlorohydrocarbon solvents such as toluene or chlorohexane and contain about 1% to 30% and preferably 5% to 20% by weight of a finely divided powdery silica, usually referred to as precipitated or fumed silica and available under the trade name of Cab-O-Sil. It is most desirable that the primer contain a polymeric material to give the primer body and to aid in maintaining the finely divided silica in suspension. A very desirable primer is a toluene suspension of about 5% to 30% finely divided powdery silica, and about 10% to 60% of a polymer on a weight basis. Preferably acrylic or methacrylic ester polymers are used. Well-known solvents other than toluene may be used. The acrylic esters may be the esters of the lower alcohols such as ethyl, propyl, butyl, 2-ethylhexyl with the acids of acrylic and methacrylic to give methyl acrylate, methyl methacrylate, ethyl acrylate, ethyl methacrylate, butyl acrylate, butyl methacrylate, 2-ethylhexyl acrylate, and 2-ethylhexyl methacrylate alone or mixtures thereof or with polyvinyl acetate. A very preferred primer is a mixture of about 8% to 15% precipitated silica, about 18% to 28% of the acrylic esters known as Acryloid-72 and 57% to 74% toluene.

The primer may be applied to the jacket in the areas 80 and 81 and dried prior to wrapping the jacket to the molded fiberglass pipe 83. Also, the acrylic type primers are preferred with the acrylic permanent adhesive. Although the elastomeric type primer may be used, they particularly are useful with the elastomeric adhesives.

Thus by use of an adhesive construction having a support liner with a permanent adhesive layer on one side thereof and pressure sensitive removal adhesive with a release member properly positioned therebetween, it is possible to provide a pipe insulation having an adhesive construction that is unique.

Figure 9:
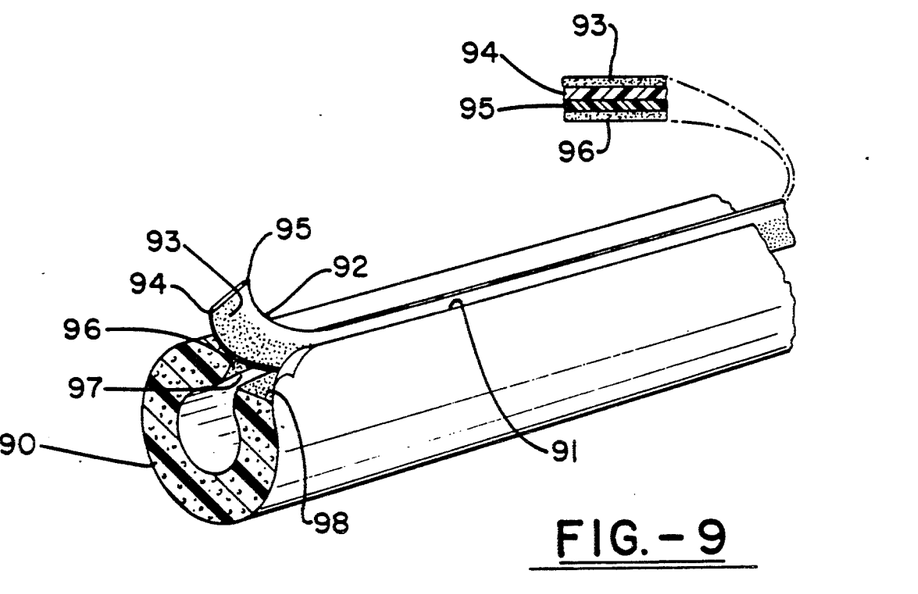
FIG. 9 is a perspective view of a specific embodiment of this invention as used with a section of pipe insulation to seal the slit therein.

Another use of the adhesive construction of this invention is illustrated in FIG. 9 where 90 is the section of pipe insulation and 91 is the slit. A preferred form of the adhesive construction 92 is shown positioned in the slit 91. This adhesive construction comprises a layer of removable pressure sensitive adhesive 93 on a Kraft paper sheet or center liner 94 having a release coat 95 on the center liner opposite the side of liner 94 removable pressure sensitive layer or coat on said center liner. As the center liner 94 is pulled from the slit, it takes the removable pressure sensitive adhesive layer 93 and release coat 95. The permanent pressure sensitive layer or coat 96 on release coat 95 is stripped away to leave a layer or coat 96 of permanent pressure sensitive adhesive adhered to the face 97. With the center liner stripped from the section of pipe insulation, it can be closed around a piece of pipe. Then, the section of slit face 97 can be brought into contact with slit face 98 whereby the layer or coating 96 of permanent pressure sensitive adhesive transferred from the center liner adheres the two faces of the slit together.

It is desirable in some cases to prime at least one face of the slit with a primer such as described herein. The primed face enhances the bonding of the adhesive to the face. The construction of FIG. 9 allows the pipe insulation to be stored, shipped and handled in the closed mode, as the removable pressure sensitive adhesive adheres to face 98 but is stripped from face 98 upon removal of the center liner 94.

Figure 10:
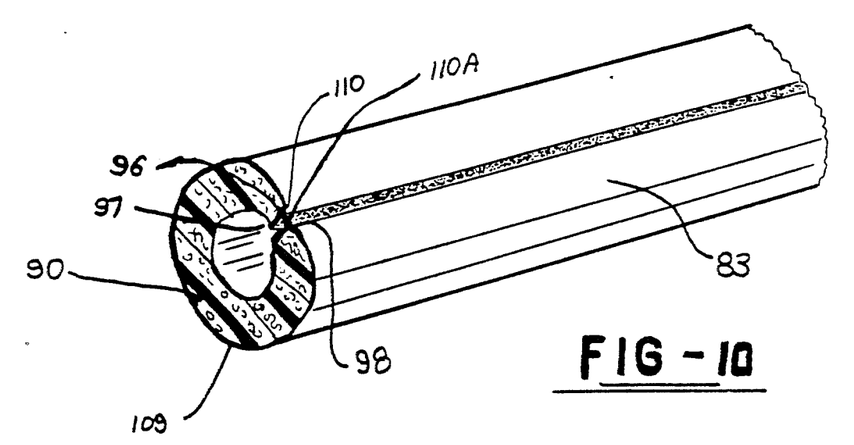
FIG. 10 is a perspective view of another specific embodiment of this invention as used with a section of pipe insulation to seal the slit thereof having the ends of the jacket adhered to the sides or faces of the slit.

Referring to FIG. 10, the fiberglass insulation section 90 is shown wrapped in a jacket 109 such as the well known ASJ jacket with each end 110 of the jacket tucked inside the slit 98 to the slit faces 111. The tucked in ends 100 of the jacket are preferably adhered to the faces 111 of the slit with an adhesive such as the well known hot melt adhesive to adhere to this insulation having the ends of the jacket tucked into the slit. The adhesive construction of FIG. 9 can be placed in the slit and be adhered to the ends of the jacket to give the product of FIG. 10. Thus, the adhesive construction of this invention where the center liner has the release coat on one of its sides covered with a layer of a permanent pressure sensitive adhesive and the other side has layers of removable pressure sensitive adhesive. Thus, the adhesive construction in the slit of FIG. 10 has the permanent pressure sensitive adhesive adhered to the tucked or folded in end 110A of the jacket and the removable pressure sensitive adhesive layer is adhered to the tucked in end 110B of the jacket. Thus, when it is time to place it on a piece of pipe, the center liner and removeable pressure sensitive layer are removed to open the slit and the open slit is placed over the pipe and pressed together to close the faces of the slit by means of the permanent pressure sensitive adhesive to retain the insulation section on the pipe.

What is claimed is:

1. An insulation construction comprising an elongated insulation member having a longitudinal slit therein to allow the insulation to be fitted on or around a shaped article by an adhesive construction positioned in said slit, said adhesive construction comprising a center liner having a first and second side with a layer of removable pressure sensitive adhesive coated on the first side of said liner and removably adhered to a first face of the slit, a layer of permanent adhesive adhered to a second face of the slit and covering a layer of release coated on the liner so as to allow the second side of the center liner to be removed and first and second face of the slit to be adhered together by said permanent adhesive.

2. The insulation construction of claim 1 wherein the elongated insulation member is a porous plastic.

3. The insulation construction of claim 2 wherein the permanent adhesive is pressure sensitive.

4. The insulation construction of claim 1 wherein the permanent adhesive layer includes at least one carrier or strengthening layer.

5. The insulation construction of claim 1 wherein the elongated insulation member is a shaped fibrous material.

6. The insulation construction of claim 1 wherein the removable pressure sensitive adhesive is an acrylate containing about 0.2 to about 5 parts by weight percent of a vinyl unsaturated, homopolymerizable emulsifier monomer which is a surfactant having both a hydrophobic and hydrophilic moiety.

7. The adhesive coated product of claim 1 in which an adhesive is coated onto a primer which has been applied to kraft side of a jacket and dried to a film, prior to applying the permanent pressure sensitive adhesive.

8. The adhesive coated product of claim 7 in which the primer contains a finely powdered silica, a polymeric acrylic or methacrylic ester, and sufficient diluent to produce a solution which can be applied to kraft side of a jacket to enhance adherence of the adhesive.

9. The adhesive coated product of claim 8 in which the primer comprises from about 5% to 30% of a finely divided powdered silica, from 10% to 60% of at least one polymeric acrylic or methacrylic ester and from 10% to 85% of a solvent on a weight basis.

10. An insulation construction comprising an elongated insulation member having an elongated slit having a first and second face adjacent thereto, and on opposite sides thereof, to allow the insulation to be fitted on or around a shaped article and an adhesive construction for closing said slit said adhesive construction being composed of a permanent pressure sensitive adhesive bonded to the first face adjacent the slit and contacting a release layer, said release layer being adhered to one side of a center liner having a removable pressure sensitive adhesive layer adhered to the other side of said center liner, said removable pressure sensitive layer being removably bonded to second face of the slit to hold the slit closed until the center liner is removed to allow adhesive on said first face to adhere to the second face to adhere the slit closed.

11. The insulation construction of claim 10 wherein at least one face has a primer coat thereon when contacted with the permanent pressure sensitive adhesive.

12. An adhesive construction for an insulation member, said insulation member being covered with a jacket with each end of the jacket being folded inside a longitudinal slit to contact respectively a first and second face of the slit in said insulation member, said adhesive construction being positioned in said slit and comprising a center liner having a release coat on one side of said liner covered with a layer of a permanent pressure sensitive adhesive adhered to the jacket on one face, and other side of said center liner being covered with a layer of removable pressure sensitive adhesive, said removable pressure sensitive adhesive being adhered removably to said jacket on other face of said slit to permit the insulation member to be closed in storage mode but be installed in permanent position when the center liner and removable pressure sensitive adhesive is removed.

* * * * *